(12) United States Patent
Jones et al.

(10) Patent No.: US 12,275,467 B2
(45) Date of Patent: Apr. 15, 2025

(54) ULTRASONIC WEAR MEASUREMENT FOR A TRACK PAD

(71) Applicant: Caterpillar Inc., Peoria, IL (US)

(72) Inventors: Benjamin Isaac Jones, Bartonville, IL (US); Mircea Dumitru, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 1002 days.

(21) Appl. No.: 17/156,762

(22) Filed: Jan. 25, 2021

(65) Prior Publication Data

US 2022/0234660 A1 Jul. 28, 2022

(51) Int. Cl.
  *B62D 55/20* (2006.01)
  *B62D 55/21* (2006.01)
  *B62D 55/26* (2006.01)
  *G01N 29/04* (2006.01)

(52) U.S. Cl.
  CPC .......... *B62D 55/202* (2013.01); *B62D 55/21* (2013.01); *B62D 55/26* (2013.01); *B62D 55/20* (2013.01); *G01N 29/043* (2013.01); *G01N 2291/0258* (2013.01); *G01N 2291/02854* (2013.01); *G01N 2291/0289* (2013.01)

(58) Field of Classification Search
  CPC .... B62D 55/20; B62D 55/202; B62D 55/205; B62D 55/21; B62D 55/26
  See application file for complete search history.

(56) References Cited

U.S. PATENT DOCUMENTS

| | | | |
|---|---|---|---|
| 1,564,461 A * | 12/1925 | Athey | B62D 55/08 |
| | | | 305/49 |
| 5,804,731 A | 9/1998 | Jaeggi | |
| 9,409,613 B2 | 8/2016 | Hakes | |
| 9,434,428 B2 | 9/2016 | Hakes et al. | |
| 10,745,070 B2 | 8/2020 | Jones | |
| 2005/0151421 A1* | 7/2005 | Colwell | B62D 55/26 |
| | | | 305/185 |
| 2014/0346856 A1* | 11/2014 | Colwell | B62D 55/12 |
| | | | 305/185 |
| 2015/0130268 A1* | 5/2015 | Scheuerman | B62D 55/26 |
| | | | 305/116 |
| 2016/0023696 A1 | 1/2016 | Hakes et al. | |
| 2016/0176456 A1* | 6/2016 | Oertley | B62D 55/211 |
| | | | 305/186 |
| 2016/0185404 A1* | 6/2016 | Westoby | B62D 55/14 |
| | | | 305/201 |
| 2017/0240230 A1* | 8/2017 | Colwell | B62D 55/14 |
| 2017/0275717 A1* | 9/2017 | Saad | C21D 9/0068 |
| 2018/0319448 A1 | 11/2018 | Acosta et al. | |
| 2019/0283818 A1* | 9/2019 | Jones, Jr. | B62D 55/202 |
| 2019/0283819 A1 | 9/2019 | Jones et al. | |
| 2020/0223501 A1 | 7/2020 | Jones et al. | |

FOREIGN PATENT DOCUMENTS

| | | | | |
|---|---|---|---|---|
| EP | 0058520 A2 * | 8/1982 | | |
| WO | WO-2014027531 A1 * | 2/2014 | ............ | B62D 55/12 |
| WO | 2015187333 | 12/2015 | | |

* cited by examiner

*Primary Examiner* — Kip T Kotter

(57) ABSTRACT

An onboard track machine wear measurement system has an ultra-sonic probe that is attached to an undercarriage of the machine that is disposed adjacent a track chain assembly, and a controller that is in communication with the ultra-sonic probe. The controller is configured to determine the thickness of a load bearing wall of a track component of the track chain assembly.

20 Claims, 5 Drawing Sheets

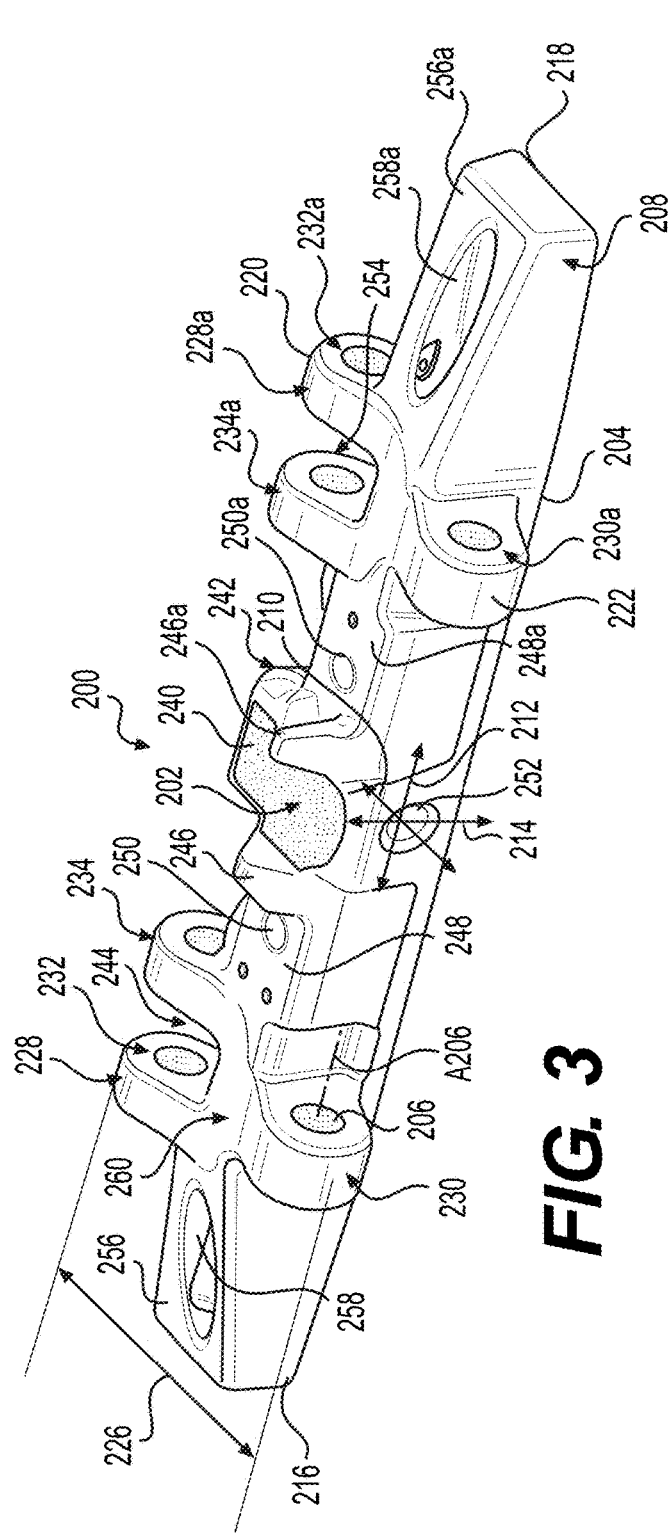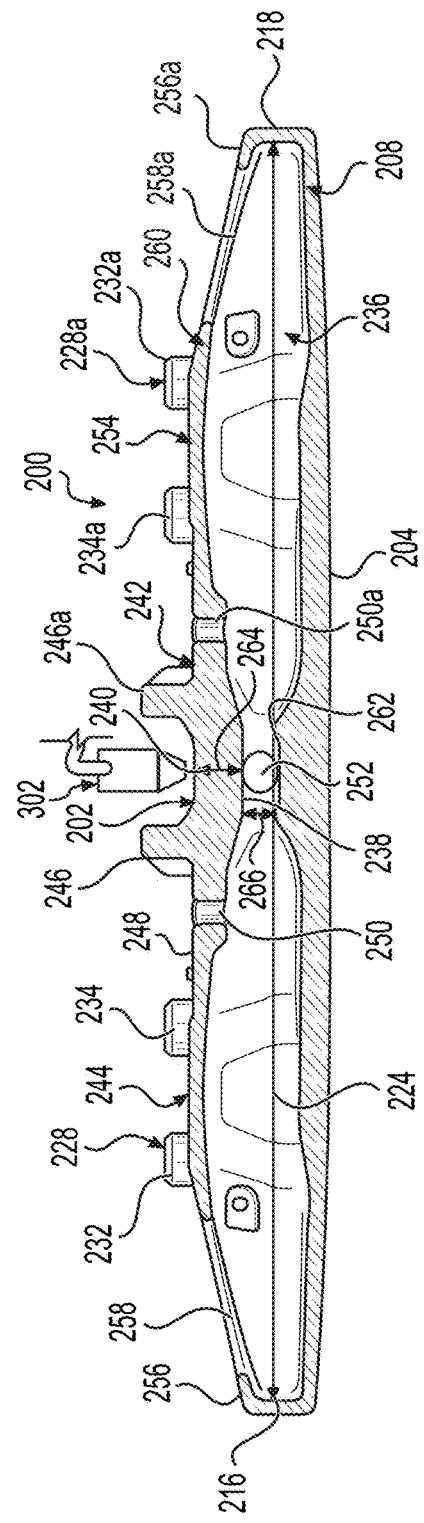

ULTRASONIC WEAR MEASUREMENT FOR A TRACK PAD

TECHNICAL FIELD

The present disclosure relates to track pads that are used to support heavy equipment such as electric rope shovels, hydraulic mining shovels, and the like. Specifically, the present disclosure relates to such track pads that allow for accurate wear measurement of load bearing surfaces.

BACKGROUND

In various mining applications, the track pad is subject to heavy loads, requiring that the track pad be robust. Also, dirt, rocks, debris, and other contaminants may infiltrate various components of the undercarriage that may cause the track pads to wear. More specifically, load bearing surfaces of the track pad may become worn due to the repeated roller contact between the idler, track rollers, and sprocket of the undercarriage. This may be exacerbated by the contaminants that infiltrate at the rolling point of contact between a track pad and any of these undercarriage components. Eventually, the thickness of the load bearing structure may be become too thin, warranting replacement. It is desirable to monitor this wear and replace the track pad at planned service intervals to reduce the unplanned downtime of the machine.

Current techniques to measure this wear include comparing the distance from the top surface of a drive lug to the load bearing surface after use and compare that to the original distance when the track pad is new. However, the top surface of a drive lug is also subject to wear, which may lead to an underestimation of the wear and unforeseen track problems in between planned service intervals.

U.S. Pat. Appl. Publ. No. 20160023696 A1 discloses a crawler shoe for a mining vehicle that includes a first wear surface, a second wear surface positioned opposite the first wear surface, a recess formed within the first wear surface and including a measurement datum formed at a bottom portion of the recess. The measurement datum is positioned below the first wear surface such that the measurement datum is subjected to less service wear than the first wear surface. An approximately linear transmission path may be provided that is configured to receive an ultrasonic signal, and that extends from the measurement datum to the second wear surface.

However, since the recess is on the bottom of the track pad, the track chain assembly typically needs to be removed and disassembled to allow access to the recess for insertion of an ultrasonic probe to measure the wear. An easier method of wear measurement that does not necessarily need the track chain to be disassembled is thus warranted, etc.

SUMMARY

A track pad according to an embodiment of the present disclosure may comprise a shoe member including a ground engaging surface, and defining a track chain traveling direction, a lateral direction perpendicular to the track chain traveling direction, and a vertical direction perpendicular to both the lateral direction, and the track chain traveling direction. The shoe member may further define a first lateral end, a second lateral end, a front end along the track chain traveling direction, and a rear end along the track chain traveling direction, a lateral distance from the first lateral end to the second lateral end, and a width from the front end to the rear end along the track chain traveling direction that is less than the lateral distance. A first link member may extend upwardly from the shoe member including a first lug member extending from the first link member in a first direction parallel to the track chain traveling direction, as well as a second lug member and a third lug member both extending from the first link member in a second direction opposite of the first direction, forming a first fork portion. The track pad includes a load bearing surface, while the ground engaging surface may lack apertures, and the track pad may define an interior cored-out portion including a planar surface that is disposed both laterally and along the track chain traveling direction adjacent to the load bearing surface, and vertically underneath the load bearing surface.

A track pad according to another embodiment of the present disclosure may comprise a shoe member including a ground engaging surface, and defining a track chain traveling direction, a lateral direction perpendicular to the track chain traveling direction, and a vertical direction perpendicular to both the lateral direction, and the track chain traveling direction. The shoe member may further define a first lateral end, a second lateral end, a front end along the track chain traveling direction, and a rear end along the track chain traveling direction, a lateral distance from the first lateral end to the second lateral end, and a length from the front end to the rear end along the track chain traveling direction that is less than the lateral distance. A top surface may extend laterally from the first lateral end to the second lateral end, while the ground engaging surface may extend uninterruptedly from the first lateral end to the second lateral end. The top surface may include a planar load bearing surface that is perpendicular to the vertical direction. Also, the shoe member may define an interior hollow portion that may be partially defined by an interior planar surface that is disposed below the first planar load bearing surface.

An onboard track machine wear measurement system according to an embodiment of the present disclosure may comprise an ultra-sonic probe that is attached to an undercarriage of the machine that is disposed adjacent a track chain assembly, and a controller that is in communication with the ultra-sonic probe. The controller may be configured to determine the thickness of a load bearing wall of a track component of the track chain assembly.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings:

FIG. 3 is a perspective view of a track pad of FIG. 2 shown in isolation.

FIG. 4 is cross-sectional view of the track pad of FIG. 3, revealing the cored-out interior structure of the track pad with a flat surface that may be used to measure the thickness of the load bearing wall, and the wear of the load bearing surface via ultra-sonic wear measurement.

DETAILED DESCRIPTION

Figure 1:
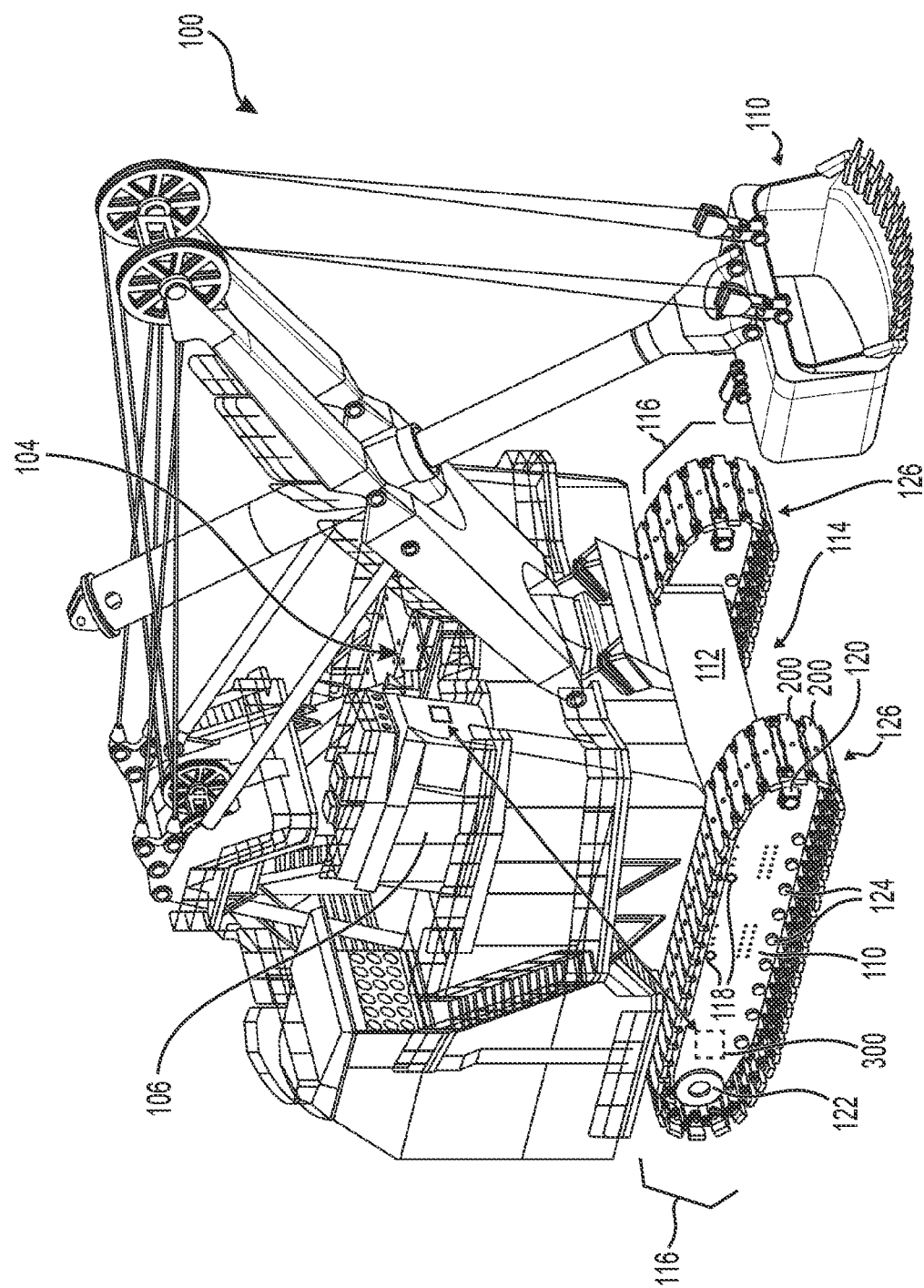
FIG. 1 illustrates a machine in the form of an electric shovel that has an undercarriage that may use track chain assemblies having track pads constructed according to the various embodiments disclosed herein.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b etc. It is to be understood that the use of letters immediately after a reference number indicates that these features are similarly shaped and have similar function as is often the case when geometry is mirrored about a plane of symmetry. For ease of explanation in this specification, letters will often not be included herein but may be shown in the drawings to indicate duplications of features discussed within this written specification.

While the arrangement is illustrated in connection with an electric rope shovel, the arrangement disclosed herein has universal applicability in various other types of machines commonly employ track systems, as opposed to wheels. The term "machine" may refer to any machine that performs some type of operation associated with an industry such as mining, earthmoving, or construction, or any other industry known in the art. For example, the machine may be a hydraulic mining shovel, an excavator, wheel loader, cable shovel, or dragline or the like. Moreover, one or more implements may be connected to the machine. Such implements may be utilized for a variety of tasks, including, for example, lifting and loading. Among other uses, an electric shovel can be used to load overburden and ore into haul trucks during the mining process in various surface mine applications.

Looking at FIG. 1, a machine 100 that may use track pads constructed according to various embodiments of the present disclosure can be seen. The machine 100 may include a body 104 with a cab 106 to house a machine operator. The machine may also include a boom system 108 pivotally connected at one end to the body 104 and supporting an implement 110 at an opposing, distal end. In embodiments, the implement 110 can be any suitable implement, such as a bucket, a clamshell, a blade, or any other type of suitable device. A control system can be housed in the cab 106 that can be adapted to allow a machine operator to manipulate and articulate the implement 110 for digging, excavating, or any other suitable application. This same control system may be part of or incorporate, or be in communication with the onboard track machine wear measurement system 300 that will be discussed in further detail later herein.

The body 104 may be supported on a main frame 112 supported on an undercarriage structure 114. The undercarriage structure 114 includes a supporting structure 118 that supports a track system 102 utilized for movement of the machine 100. The track system 102 may include first and second track roller frame assemblies 116, which are spaced from and adjacent respective first and second sides of the undercarriage structure 114.

Each of the track roller frame assemblies 116 carries an idler wheel 120, a drive sprocket wheel 122, and a plurality of track guiding rollers 124. The drive sprocket wheel 122 is powered in forward and reverse directions by the machine 100 (via a motor such as an internal combustion engine). An endless track chain assembly 126 encircles each drive sprocket wheel 122, the idler wheel 120, and the track guiding rollers 124. The track chain assembly 126 includes a plurality of interconnected track pads 200, also referred to as track chain members herein. The track guiding rollers 124 guide the track pads 200 as the track chain assembly 126 is driven by the drive sprocket wheel 122. The track chain assembly 126 may have any track chain member, track pin retention device, and/or track chain assembly.

Figure 2:
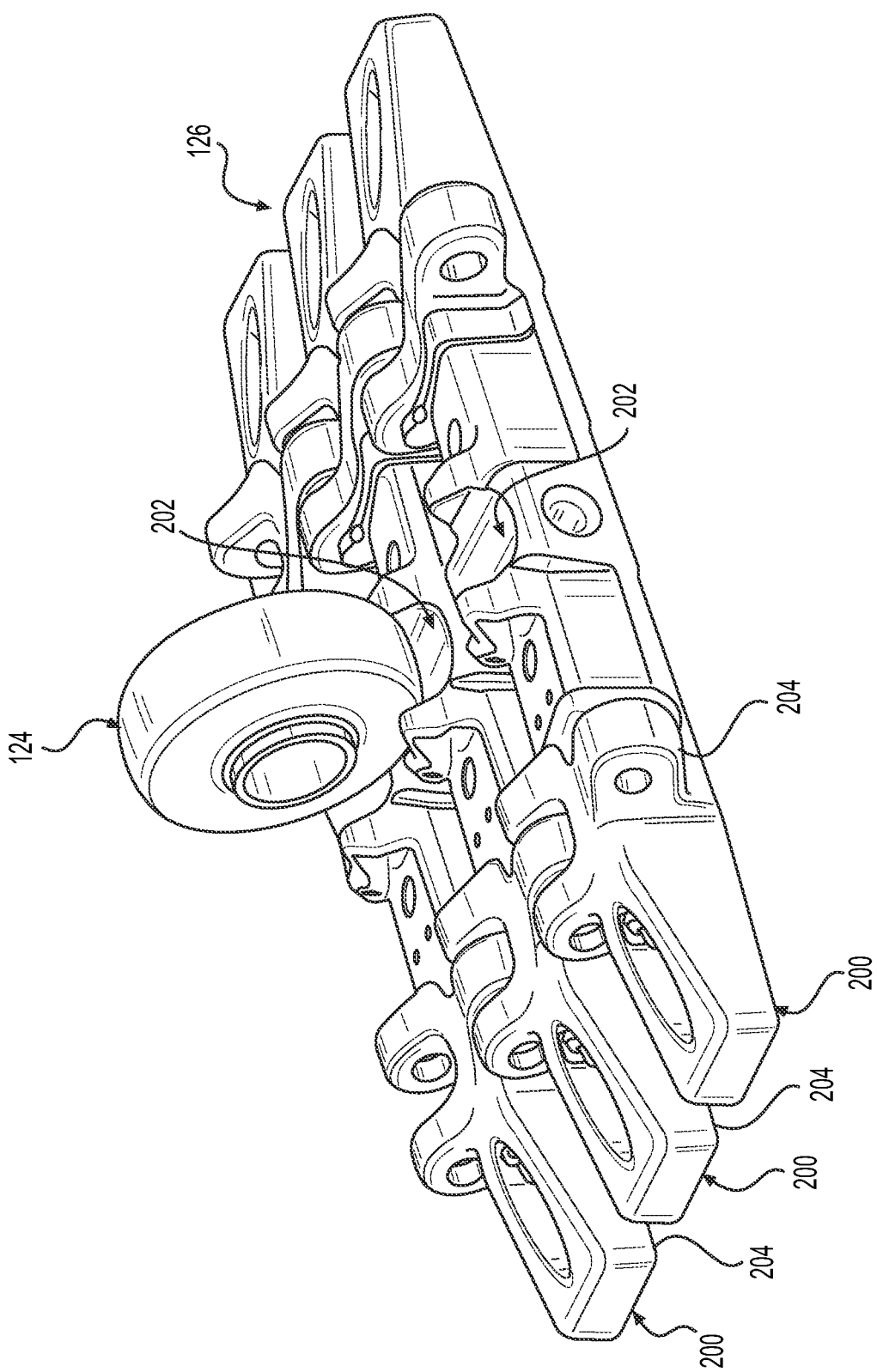
FIG. 2 is a perspective view of a portion of the undercarriage, track chain assembly, and track pads of FIG. 1.

FIG. 2 illustrates a portion of the track chain assembly 126 including two pads 200 that are pivotally connected to each other. A track roller 124 is also shown that rides on a load bearing surface of the track pads 200. Hence, the weight of the machine 100 is transmitted through the undercarriage structure 114 (see FIG. 1) through the track rollers 124 to the track pad 200, which transmits that load to the ground through its ground engaging surface 204. A thru-slot 136 extends along the track chain traveling direction 210 that allows the guide ridge 134 of the track roller to pass from one track pad to the next unhindered while providing lateral guidance of the track chain assembly 126.

A track pad 200 according to an embodiment of the present disclosure may ease wear measurement will now be described with reference to FIGS. 2 and 3.

The track pad may comprise a shoe member 208 including a ground engaging surface 204, and defining a track chain traveling direction 210 (typically perpendicular to the axis A206 of bore 206 that provides a pivoting axis for the joint between two track pads), a lateral direction 212 that is perpendicular to the track chain traveling direction 210, and a vertical direction 214 that is perpendicular to both the lateral direction 212, and the track chain traveling direction 210.

Moreover, the shoe member 208 may further define a first lateral end 216, a second lateral end 218, as well as a front end 220 along the track chain traveling direction 210, and a rear end 222 along the track chain traveling direction 210. A lateral distance 224 may be measured from the first lateral end 216 to the second lateral end 218, as well as a width 226 from the front end 220 to the rear end 222 along the track chain traveling direction 210 that is less than the lateral distance 224.

A first link member 228 may extend upwardly from the shoe member 208 that includes a first lug member 230 extending from the first link member 228 in a first direction parallel to the track chain traveling direction 210, a second lug member 232, and a third lug member 234 that both extending from the first link member 228 in a second direction opposite of the first direction, forming a first fork portion 244.

As just mentioned herein, the track pad 200 also includes a load bearing surface 202 on top of the track pad for receiving the weight of the machine through the track roller. The ground engaging surface 204 may lack apertures. Instead, the track pad 200 may defines an interior cored-out portion 236 including a planar surface 238 that is disposed both laterally and along the track chain traveling adjacent to the load bearing surface 202, and vertically underneath the load bearing surface 202.

A second link member 228a may extend upwardly from the shoe member 208 including a fourth lug member 230a that extends from the second link member 228a along the first direction parallel to the track chain traveling direction 210, a fifth lug member 232a, and a sixth lug member 234a both extending from the second link member 228a in the second direction opposite of the first direction, forming a second fork portion 254.

The first lug member 230 may be disposed laterally between the second lug member 232, and the third lug member 234. Likewise, the fourth lug member 230a may be disposed laterally between the fifth lug member 232a, and the sixth lug member 234a. This allows the first lug member of a track pad to mate with the second and third lug member of an adjacent track pad such to form a pivoting connection of a track chain assembly as shown in FIG. 2.

With continued reference to FIGS. 3 and 4, the first lug member 230 may define a first bore (e.g., see 206) defining an axis of rotation (e.g., see A206) that is perpendicular to the track chain traveling direction 210 as alluded to earlier herein. The load bearing surface 202 may include a flat face 240 for reducing friction between this face and the track roller and/or for easing wear measurement.

The track pad 200 may further comprises a central support portion 242 with the load bearing surface 202 disposed on top of this central support portion 242. A first drive lug 246, and a second drive lug 246a are also provided that are intended to be engaged by the drive sprocket to move the track chain assembly, and as a result the machine. The first drive lug 246 may be disposed laterally adjacent to the load bearing surface 202 toward the first lateral end 216, whereas the second drive lug 246a may be disposed laterally adjacent the load bearing surface 202 toward the second lateral end 218.

A first lateral intermediate surface 248 may be disposed laterally between the first drive lug 246 and the first link member 228, and a second lateral intermediate surface 248a may be disposed laterally between the second drive lug 246a and the second link member 228a.

Various features may also be provided to aid in manufacturing the track pad 200 via a casting process. For example, a first aperture 250 may extend vertically through the first lateral intermediate surface 248 to the interior cored-out portion 236, and a second aperture 250a that extend vertically through the second lateral intermediate surface 248a to the interior cored-out portion 236. Similarly, the central support portion 242 defines a horizontal aperture 252 extending through the central support portion 242.

A first top beveled surface 256 may extend laterally from the first link member 228 to the first lateral end 216, as well as a second top beveled surface 256a that may extend laterally from the second link member 228a to the second lateral end 218. A first side aperture 258 may extend through the first top beveled surface 256 to the interior cored-out portion 236, and a second side aperture 258a extending through the second top beveled surface 256a to the interior cored-out portion 236. Bottom chamfered surfaces on the ground engaging surface may be disposed vertically below the top beveled surfaces as shown in FIGS. 3 and 4. This may not be the case for other embodiments of the present disclosure.

These various apertures allow for removal of the sand core that forms the cored-out portion. This features may be omitted in other embodiments of the present disclosure.

The track pad 200 according to another embodiment may be described as follows with reference to FIGS. 3 and 4. The track pad 200 may have a top surface 260 that extends laterally from the first lateral end 216 to the second lateral end 218. The ground engaging surface 204 may extend uninterruptedly from the first lateral end 216 to the second lateral end 218. The top surface 260 defines a plurality of apertures extending (e.g., see 250, 250a, 258, 258a) through the top surface 260 to an interior hollow portion (e.g., see 236), and the top surface 260 includes a planar load bearing surface (e.g., see 240) that is perpendicular to the vertical direction 214, and the interior hollow portion (e.g., see 236) is partially defined by an interior planar surface (e.g., see 238) that is disposed below the first planar load bearing surface (e.g., see 240).

In addition, the interior hollow portion is at least partially defined by a bottom interior surface 262 that is disposed vertically below the interior planar surface (e.g., see 238). This may not be the case for other embodiments of the present disclosure.

As best seen in FIG. 4, the track pad 200 may define a minimum vertical height 264 from load bearing surface 202 to the interior planar surface (e.g., see 238), and the bottom interior surface 262 is spaced a minimum vertical distance 268 from the interior planar surface (e.g., see 238). A ratio of the minimum vertical height to the minimum vertical distance may range from 1.02 to 1.73 (e.g., with a nominal value of 1.33) in some embodiments of the present disclosure.

In such an embodiment, the minimum vertical distance 266 may range from 66.5 mm to 112.5 mm (e.g., with a nominal value of 86.5 mm), the minimum vertical height may range from 88.5 mm to 150.0 mm (e.g., with a nominal value of 115.0 mm), and a similar vertical height dimension (not shown) may be measured from the bottom interior surface to the ground engaging surface 204 that may range from 98.5 mm to 166.4 mm (e.g., with a nominal value of 128.0 mm). Also, the interior hollow portion has a hour glass configuration extending from the first lateral end 216 to the second lateral end 218 with a necked down region defined by the minimum vertical distance 266. It should be noted that these dimensions and ratios are material dependent so that the composition and hardness of the material affects them. The above parameters may be applicable when alloy steel is employed. But, if a softer material such as a steel employing manganese is employed, then thicker dimensions might be warranted. For this embodiment, one skilled in the art might expect up to 30.0 mm of wear on the top surface, and 15.0 mm of wear on the bottom surface depending on the application before maintenance is required.

The track pad may be a unitary body as shown or be an assembly of different parts. Often, the shoe member and the first rail member, and the second rail member consist essentially of metallic material such as cast iron, steel, grey cast iron, etc.

Again, any of the aforementioned features and their associated dimensions and/or ratios may be altered to be different than what has been shown or mentioned herein in other embodiments of the present disclosure.

INDUSTRIAL APPLICABILITY

In practice, a track chain assembly, a track pad or a portion thereof may be sold, manufactured, bought etc. and attached to the machine in the aftermarket or original equipment scenarios according to any of the embodiments discussed herein. That is to say, the machine may be sold with the track chain assembly, track pad and/or portion thereof according to embodiments described herein or the machine may be retrofitted, repaired, refurbished to use any of the embodiments discussed herein. The various components including, but not limited to the track pads, may be used from any suitable material such as cast iron, grey cast iron, steel, etc.

As can be seen, various embodiments of the track pad disclosed herein may ease the measuring of the wear of a track pad or other track component such as a track link, a track shoe, etc.

In practice, an onboard track machine wear measurement system 300 may be provided that allows the measurement of wear of track component of a track chain assembly while the track chain is being used by the machine.

Such a system 300 may comprise an ultra-sonic probe 302 that is attached to an undercarriage of the machine that is disposed adjacent a track chain assembly (as shown in FIG. 1). A controller 304 may be provided that is in communication with the ultra-sonic probe 302 (see FIG. 5). The controller 304 may be configured to execute a method 400 as depicted in FIG. 6 including the step of determining the thickness of a load bearing wall of a track component of the track chain assembly (see step 402 in FIG. 6). The controller may take the form of any suitable process device including a microcontroller, a microprocessor, hardwired logic, software, computer, etc.

Figure 5:
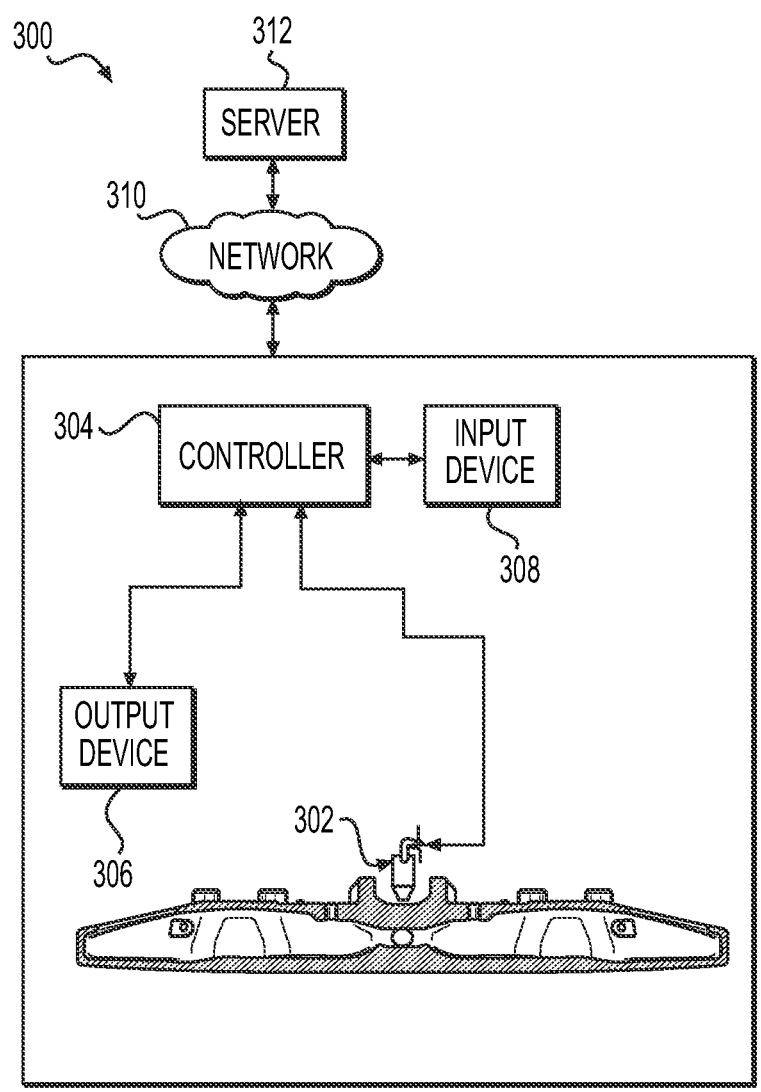
FIG. 5 is a schematic diagram representing an on-board track machine wear measurement system according to an embodiment of the present disclosure that may be used to measure the thickness of the load bearing wall of the track pad of FIG. 4.
Figure 6:
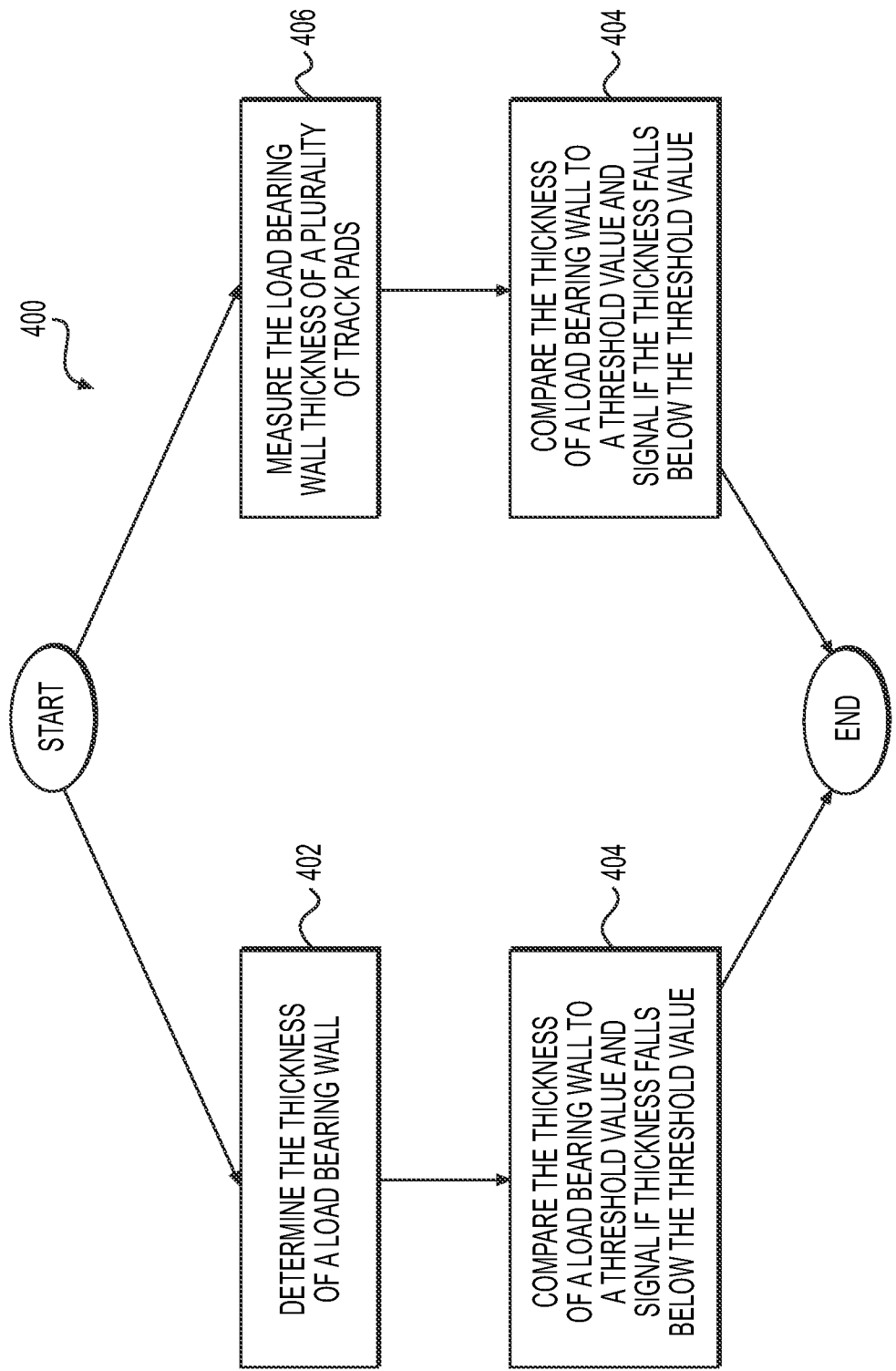
FIG. 6 is a flow chart containing a method that may be executed by the controller of the wear measurement system of FIG. 5.

The track component may take the form a track pad 200 including a load bearing surface 202, and a ground engaging surface 204, and the ultra-sonic probe 302 may be facing the load bearing surface 202 (see FIG. 5). More specifically, the track pad may include a hollow interior (e.g., see 236) with a flat surface (e.g., see 240) that is disposed underneath the load bearing surface 202.

The controller 304 may be configured to compare the thickness of the load bearing wall to a threshold value and signal if the thickness falls below the threshold value. (see step 404 in FIG. 6)

As seen in FIG. 5, an output device 306 may be provided that conveys a signal that the track pad needs maintenance, to be replaced, etc. The output device 306 may take any suitable form including a monitor, an alarm, an auditory signal via a speaker, a light, etc.

An input device 308 may be in communication with the controller 304 and may take the form of a keyboard, a mouse, a GUI (graphical user interface), HMI (human machine interface), a touchscreen, a voice command, etc.

The controller 304 may be in communication with a network 310 and the server 312 to allow others access to the wear measurement information including a base station, the Cloud, etc.

Looking once more at FIG. 1, the controller may be configured to measure the load bearing wall thickness of a plurality of track pads that pass the ultra-sonic probe as the track chain moves in operation (see 404 in FIG. 6).

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A track pad comprising:
a shoe member including a ground engaging surface, and defining a track chain traveling direction, a lateral direction perpendicular to the track chain traveling direction, and a vertical direction perpendicular to both the lateral direction, and the track chain traveling direction,
the shoe member further defining a first lateral end, a second lateral end, a front end along the track chain traveling direction, and a rear end along the track chain traveling direction, a lateral distance from the first lateral end to the second lateral end, and a width from the front end to the rear end along the track chain traveling direction that is less than the lateral distance;
a first link member extending upwardly from the shoe member,
a first lug member extending from the first link member in a first direction parallel to the track chain traveling direction, and
a second lug member and a third lug member both extending from the first link member in a second direction opposite of the first direction, forming a first fork portion;
a first drive lug;
a second drive lug; and
a load bearing surface that is between the first drive lug and the second drive lug in the lateral direction and that includes a flat face that extends across a middle of the load bearing surface in the lateral direction,
the ground engaging surface lacking apertures and the track pad defining an interior cored-out portion including a planar surface that is disposed both laterally and along the track chain traveling direction adjacent to the load bearing surface, and vertically underneath the load bearing surface,
the shoe member further defining an interior hollow portion,
the interior hollow portion being at least partially defined by a bottom interior surface that is disposed vertically below the planar surface,
the bottom interior surface being spaced a minimum vertical distance from the planar surface, and
the interior hollow portion having an hour glass configuration extending from the first lateral end to the second lateral end with a necked down region defined by the minimum vertical distance.

2. The track pad of claim 1, further comprising:
a second link member extending upwardly from the shoe member,
a fourth lug member extending from the second link member along the first direction parallel to the track chain traveling direction, and a fifth lug member and a sixth lug member both extending from the second link member in the second direction opposite of the first direction, forming a second fork portion;
   wherein the first lug member is disposed laterally between the second lug member and the third lug member, and the fourth lug member is disposed laterally between the fifth lug member and the sixth lug member.

3. The track pad of claim 1, wherein the first lug member defines a first bore defining an axis of rotation that is perpendicular to the track chain traveling direction.

4. The track pad of claim 1, wherein the track pad further comprises a central support portion, the load bearing surface is vertically disposed on top of the central support portion, the first drive lug is disposed laterally adjacent the load bearing surface toward the first lateral end, and the second drive lug is disposed laterally adjacent the load bearing surface toward the second lateral end.

5. The track pad of claim 4, further comprising:
a second link member extending upwardly from the shoe member;
a first lateral intermediate surface disposed laterally between the first drive lug and the first link member;
a second lateral intermediate surface disposed laterally between the second drive lug and the second link member;
   wherein the track pad defines a first aperture that extends vertically through the first lateral intermediate surface to the interior cored-out portion, and a second aperture that extends vertically through the second lateral intermediate surface to the interior cored-out portion.

6. The track pad of claim 5, wherein the central support portion defines a horizontal aperture extending through the central support portion.

7. The track pad of claim 5, further including a first top beveled surface extending laterally from the first link member to the first lateral end, and a second top beveled surface extending laterally from the second link member to the second lateral end;
   wherein the track pad defines a first side aperture extending through the first top beveled surface to the interior cored-out portion, and a second side aperture extending through the second top beveled surface to the interior cored-out portion.

8. A track pad comprising:
a shoe member including a ground engaging surface, and defining a track chain traveling direction, a lateral direction perpendicular to the track chain traveling direction, and a vertical direction perpendicular to both the lateral direction, and the track chain traveling direction, the shoe member further defining a first lateral end, a second lateral end, a front end along the track chain traveling direction, and a rear end along the track chain traveling direction, a lateral distance from the first lateral end to the second lateral end, and a width from the front end to the rear end along the track chain traveling direction that is less than the lateral distance; and
a top surface extending laterally from the first lateral end to the second lateral end;
   wherein the ground engaging surface extends uninterruptedly from the first lateral end to the second lateral end,
   wherein the top surface includes a planar load bearing surface that is perpendicular to the vertical direction, that is between a first drive lug and a second drive lug in the lateral direction, and that includes a flat face that extends across a middle of the planar load bearing surface in the lateral direction,
   wherein the shoe member further defines an interior hollow portion that is partially defined by an interior planar surface that is disposed below the first planar load bearing surface,
   wherein the interior hollow portion is at least partially defined by a bottom interior surface that is disposed vertically below the interior planar surface,
   wherein the bottom interior surface is spaced a minimum vertical distance from the interior planar surface, and
   wherein the interior hollow portion has an hour glass configuration extending from the first lateral end to the second lateral end with a necked down region defined by the minimum vertical distance.

9. The track pad of claim 8, further comprising:
a first link member extending upwardly from the shoe member including a first lug member extending from the first link member in a first direction parallel to the track chain traveling direction, a second lug member and a third lug member both extending from the first link member in a second direction opposite of the first direction;
a second link member extending upwardly from the shoe member including a fourth lug member extending from the second link member along the first direction parallel to the track chain traveling direction, a fifth lug member and a sixth lug member both extending from the second link member in the second direction opposite of the first direction; and
a central support portion disposed laterally between the first link member and the second link member;
   wherein the top surface defines a plurality of apertures extending through the top surface to the interior hollow portion.

10. The track pad of claim 9, wherein the planar load bearing surface partially defines the central support portion.

11. The track pad of claim 9, wherein the track pad defines a minimum vertical height from the planar load bearing surface to the interior planar surface, and wherein a ratio of the minimum vertical height to the minimum vertical distance ranges from 1.02 to 1.73.

12. The track pad of claim 9, wherein the minimum vertical distance ranges from 66.5 mm to 112.5 mm.

13. A track pad comprising:
a shoe member defining a first lateral end and a second lateral end;
a first link member extending upwardly from the shoe member;
a second link member extending upwardly from the shoe member;
a central support portion;
a load bearing surface vertically disposed on top of the central support portion;
a first drive lug disposed laterally adjacent the load bearing surface toward the first lateral end;
a second drive lug disposed laterally adjacent the load bearing surface toward the second lateral end;
a first lateral intermediate surface disposed laterally between the first drive lug and the first link member; and
a second lateral intermediate surface disposed laterally between the second drive lug and the second link member, wherein the track pad defines:
an interior cored-out portion that includes a planar surface,
a first aperture that extends vertically through the first lateral intermediate surface to the interior cored-out portion, and
a second aperture that extends vertically through the second lateral intermediate surface to the interior cored-out portion,
wherein the shoe member further defines an interior hollow portion that is partially defined by the planar surface,
wherein the interior hollow portion is at least partially defined by a bottom interior surface that is disposed vertically below the planar surface,
wherein the bottom interior surface is spaced a minimum vertical distance from the planar surface, and
wherein the interior hollow portion has an hour glass configuration extending from the first lateral end to the second lateral end with a necked down region defined by the minimum vertical distance.

14. The track pad of claim 13, wherein the shoe member includes a ground engaging surface that lacks apertures.

15. The track pad of claim 13, wherein the load bearing surface is between the first drive lug and the second drive lug.

16. The track pad of claim 13, wherein the load bearing surface includes a flat face that extends across a middle of the load bearing surface.

17. The track pad of claim 13, wherein the shoe member defines a track chain traveling direction, and
wherein the planar surface is disposed both laterally and along the track chain traveling direction adjacent to the load bearing surface, and vertically underneath the load bearing surface.

18. The track pad of claim 13, wherein the central support portion defines a horizontal aperture extending through the central support portion.

19. The track pad of claim 13, further including:
a first top beveled surface extending laterally from the first link member to the first lateral end; and
a second top beveled surface extending laterally from the second link member to the second lateral end.

20. The track pad of claim 19, wherein the track pad further defines:
a first side aperture extending through the first top beveled surface to the interior cored-out portion, and
a second side aperture extending through the second top beveled surface to the interior cored-out portion.

* * * * *